US 6,732,977 B1

(12) United States Patent
Goodzeit et al.

(10) Patent No.: US 6,732,977 B1
(45) Date of Patent: May 11, 2004

(54) SYSTEM FOR ON-ORBIT CORRECTION OF SPACECRAFT PAYLOAD POINTING ERRORS

(75) Inventors: Neil E. Goodzeit, Princeton, NJ (US); Harald J. Weigl, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 45 days.

(21) Appl. No.: 10/068,839

(22) Filed: Feb. 11, 2002

(51) Int. Cl.[7] .................................................. B64G 1/24
(52) U.S. Cl. ......................... 244/164; 244/171; 701/13
(58) Field of Search ............................. 244/138 R, 164, 244/165, 169, 171; 701/13, 226

(56) References Cited

U.S. PATENT DOCUMENTS

| 3,813,067 A | | 5/1974 | Mork |
| 4,062,509 A | | 12/1977 | Muhlfelder et al. |
| 4,071,211 A | | 1/1978 | Muhlfelder et al. |
| 4,219,940 A | | 9/1980 | Okubo |
| 4,537,375 A | | 8/1985 | Chan |
| 4,654,846 A | | 3/1987 | Goodwin et al. |
| 4,754,280 A | * | 6/1988 | Brown et al. ................ 342/357 |
| 4,767,084 A | | 8/1988 | Chan et al. |
| 4,890,284 A | | 12/1989 | Murphy et al. |
| 5,025,381 A | | 6/1991 | Goodzeit et al. |
| 5,058,835 A | | 10/1991 | Goodzeit et al. |
| 5,062,051 A | | 10/1991 | Sainct et al. |
| 5,080,307 A | | 1/1992 | Smay et al. |
| 5,092,543 A | | 3/1992 | Goodzeit |
| 5,100,084 A | | 3/1992 | Rahn et al. |
| 5,123,617 A | | 6/1992 | Linder et al. |
| 5,139,218 A | | 8/1992 | Bird et al. |
| 5,201,833 A | | 4/1993 | Goodzeit et al. |
| 5,205,518 A | | 4/1993 | Stetson, Jr. |
| 5,248,118 A | | 9/1993 | Cohen et al. |
| 5,277,385 A | | 1/1994 | Flament |
| 5,284,309 A | | 2/1994 | Salvatore et al. |
| 5,307,206 A | | 4/1994 | Haessig, Jr. |
| 5,308,024 A | * | 5/1994 | Stetson, Jr. ................ 244/165 |
| 5,335,179 A | | 8/1994 | Boka et al. |
| 5,343,398 A | | 8/1994 | Goodzeit et al. |
| 5,349,532 A | | 9/1994 | Tilley et al. |
| 5,354,016 A | | 10/1994 | Goodzeit et al. |
| 5,400,252 A | | 3/1995 | Kazimi et al. |
| 5,412,574 A | * | 5/1995 | Bender et al. ............... 244/164 |
| 5,424,872 A | | 6/1995 | Lecuyer et al. |
| 5,433,402 A | | 7/1995 | Surauer et al. |

(List continued on next page.)

FOREIGN PATENT DOCUMENTS

| EP | 0499815 | * | 8/1992 |
| EP | 0568209 | * | 11/1993 |
| EP | 0922635 | * | 11/1993 |
| EP | 0604214 | * | 3/1995 |
| EP | 0780298 | * | 6/1997 |
| EP | 0937644 | * | 8/1999 |
| EP | 1024082 | * | 8/2000 |
| JP | 321597 | * | 11/2000 |

OTHER PUBLICATIONS

Voss, L., "New Thrust for U.S. Satellites", Aerospace America, American Institute of Aeronautics & Astronautics, New York, vol. 38, No. 2, Feb. 2000, pp. 36–40.

"Electric Propulsion", Aerospace America Institute of Aeronautics & Astronautics, New York, vol. 30, No. 12, Dec. 1, 1992, p. 42.

Anzel, B., "Stationkeeping the Hughes HS 702 Satellite with a Xenon Ion Propulsion System," Congress of the International Astronautical Federation, Sep. 28, 1998.

Primary Examiner—Galen L. Barefoot
(74) Attorney, Agent, or Firm—Townsend and Townsend and Crew LLP

(57) ABSTRACT

A method for correcting spacecraft pointing errors. An orbit frequency distortion angle between a rate sensor and at least one attitude sensor is estimated. An estimated attitude of the spacecraft is adjusted to correct for the distortion angle.

56 Claims, 2 Drawing Sheets

U.S. PATENT DOCUMENTS

| | | | |
|---|---|---|---|
| 5,452,869 A | 9/1995 | Basuthakur et al. | |
| 5,458,300 A | 10/1995 | Flament et al. | |
| 5,546,309 A | 8/1996 | Johnson et al. | |
| 5,556,058 A | 9/1996 | Bender | |
| 5,562,266 A | 10/1996 | Achkar et al. | |
| 5,597,142 A | 1/1997 | Leung et al. | |
| 5,608,634 A | 3/1997 | Goodzeit et al. | |
| 5,610,820 A | 3/1997 | Shankar et al. | |
| 5,646,847 A | 7/1997 | Ratan et al. | |
| 5,654,549 A | 8/1997 | Landecker et al. | |
| 5,687,933 A | 11/1997 | Goodzeit et al. | |
| 5,692,707 A | 12/1997 | Smay | |
| 5,738,309 A * | 4/1998 | Fowell | 244/171 |
| 5,745,869 A | 4/1998 | van Bezooijen | |
| 5,749,545 A | 5/1998 | Gnatjuk | |
| 5,765,780 A | 6/1998 | Barskey et al. | |
| 5,799,904 A | 9/1998 | Goodzeit et al. | |
| 5,806,804 A | 9/1998 | Goodzeit et al. | |
| 5,813,633 A | 9/1998 | Anzel | |
| 5,845,880 A | 12/1998 | Petrosov et al. | |
| 5,931,421 A * | 8/1999 | Surauer et al. | 244/165 |
| 5,984,236 A | 11/1999 | Keitel et al. | |
| 5,984,237 A | 11/1999 | Goodzeit | |
| 5,996,941 A * | 12/1999 | Surauer et al. | 244/165 |
| 6,026,337 A | 2/2000 | Krigbaum et al. | |
| 6,032,904 A | 3/2000 | Hosick et al. | |
| 6,039,290 A | 3/2000 | Wie et al. | |
| 6,047,927 A | 4/2000 | Heiberg et al. | |
| 6,089,507 A | 7/2000 | Parvez et al. | |
| 6,102,337 A | 8/2000 | Quartararo | |
| 6,108,594 A | 8/2000 | Didinsky et al. | |
| 6,116,543 A | 9/2000 | Koppel | |
| 6,145,790 A | 11/2000 | Didinsky et al. | |
| 6,213,432 B1 | 4/2001 | Koppel | |
| 6,260,805 B1 | 7/2001 | Yocum, Jr. et al. | |
| 6,282,467 B1 | 8/2001 | Shah et al. | |
| 6,285,927 B1 * | 9/2001 | Li et al. | 244/171 |
| 6,285,928 B1 | 9/2001 | Tilley et al. | |
| 6,292,722 B1 | 9/2001 | Holmes et al. | |
| 6,296,207 B1 | 10/2001 | Tilley et al. | |
| 6,314,344 B1 | 11/2001 | Sauer et al. | |
| 6,327,523 B2 | 12/2001 | Cellier | |
| 6,336,062 B1 | 1/2002 | Yamashita | |
| 6,356,815 B1 * | 3/2002 | Wu et al. | |
| 6,381,520 B1 * | 4/2002 | Highham et al. | |
| 6,389,336 B2 * | 5/2002 | Cellier | |
| 6,442,385 B1 * | 8/2002 | Marko | |
| 6,470,243 B1 * | 10/2002 | Eyerly et al. | 244/171 |
| 6,481,672 B1 * | 11/2002 | Goodzeit et al. | |
| 2002/0119750 A1 * | 8/2002 | Youssefi | |

\* cited by examiner

SYSTEM FOR ON-ORBIT CORRECTION OF SPACECRAFT PAYLOAD POINTING ERRORS

FIELD OF THE INVENTION

The present invention relates to attitude control of a spacecraft and, in particular, to ensuring accurate payload pointing performance.

BACKGROUND OF THE INVENTION

For a spacecraft to perform its mission generally requires precise orientation control of the spacecraft payload relative to its target. For example, the antenna of a geosynchronous communications satellite must generally be pointed at a fixed location on the earth. Spacecraft that use a zero-momentum control system require an on-board attitude determination system to accurately determine the spacecraft orientation in order to control the attitude. Based on the estimated attitude, the control logic applies a torque to the spacecraft to correct the error between the desired and estimated attitude.

A well established method of spacecraft attitude determination relies on an inertial measurement unit (IMU) to measure spacecraft rate. The rate measurement is used to propagate the estimated spacecraft attitude; biases in the IMU gyro outputs will therefore corrupt the attitude estimate and degrade payload pointing performance. In order to improve the accuracy of the propagated attitude estimate, the spacecraft yaw, roll, and pitch angles are measured using a complement of sensors such as an earth sensor, sun sensor, and star tracker. The propagated attitude from the IMU and the measured spacecraft angles are used by an extended Kalman filter (EKF) to calculate errors in the propagated attitude and the gyro biases. The estimation error and bias outputs of the EKF are used to correct the estimated attitude and the IMU rate measurements.

A major shortcoming of the prior-art attitude determination system is the degradation in estimated attitude due to angular distortions between the IMU and the attitude sensor(s) as well as errors in the attitude sensor outputs. As described below, a major component of these error sources occurs at orbit frequency due to thermal distortion between the IMU and the attitude sensor(s) as well as due to changes in the sensor temperatures.

SUMMARY OF THE INVENTION

The present invention provides a method for correcting spacecraft pointing errors. According to the method an orbit frequency distortion angle between a rate sensor and at least one attitude sensor is estimated. An estimated attitude of the spacecraft is adjusted to correct for the distortion angle.

The present invention also provides a method for correcting payload pointing errors of a spacecraft. The method includes sensing the spacecraft attitude with an attitude sensor. An inertial measurement unit angular rate is determined. An orbit frequency component of an angle between an inertial measurement unit and attitude sensor is estimated to determine an angle between the payload and a reference frame of the attitude sensor.

The present invention also includes a spacecraft attitude control system that implements the above-described methods.

Still other objects and advantages of the present invention will become readily apparent by those skilled in the art from a review of the following detailed description. The detailed description shows and describes preferred embodiments of the present invention, simply by way of illustration of the best mode contemplated of carrying out the present invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood from the following specification when considered in conjunction with the accompanying drawings, in which.

DETAILED DESCRIPTION OF THE INVENTION

Figure 1:
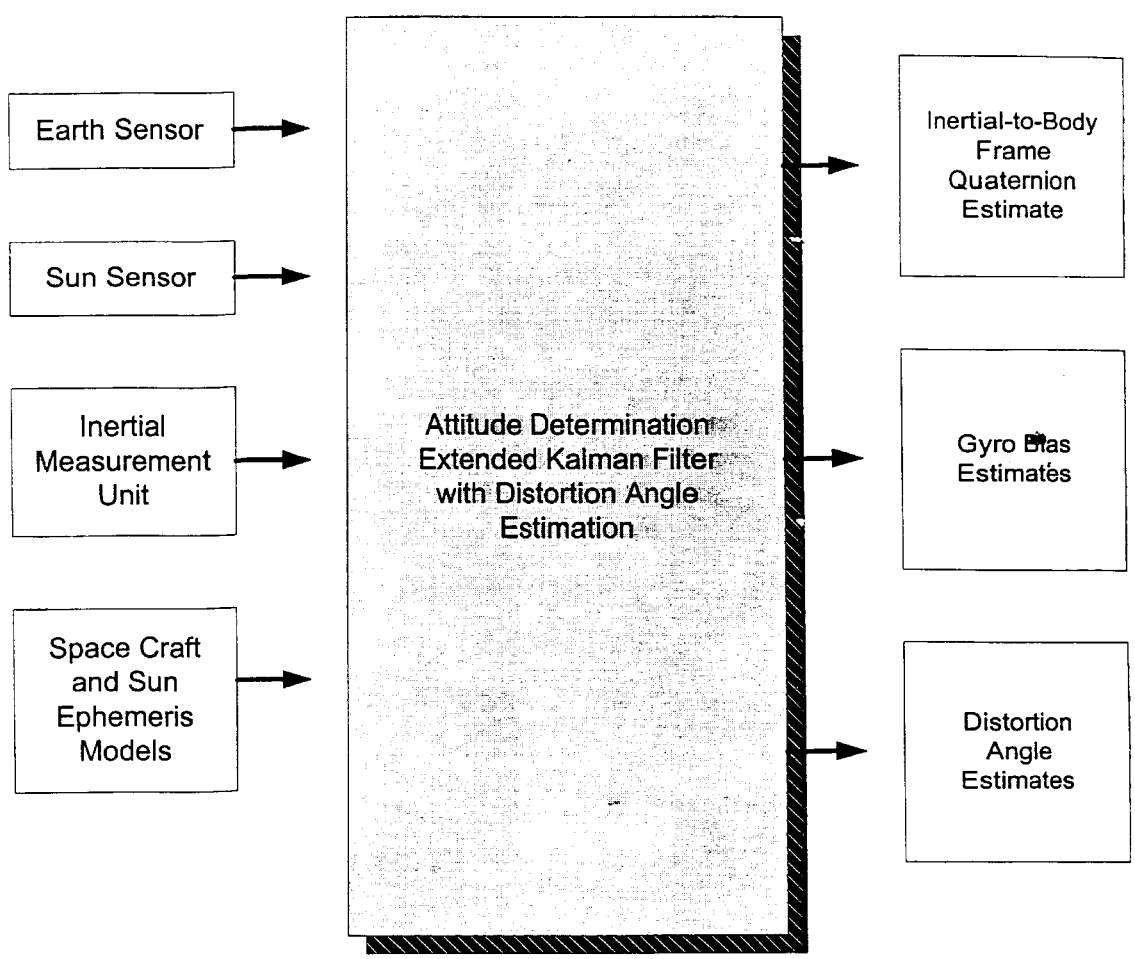
FIG. 1 represents a diagram that illustrates aspects of an embodiment of a method according to the present invention.

Significant sources of attitude estimation errors for zero-momentum spacecraft occur at orbit frequency. These errors corrupt the estimated attitude thereby degrading the spacecraft payload pointing performance. The present invention provides a method for identifying and correcting such attitude estimation error sources.

As an example, many commercial geosynchronous satellites use an earth sensor to measure the roll and pitch angles of the spacecraft. Two significant contributors to payload pointing errors are thermal distortion of the structure and earth sensor roll and pitch sensing errors. The thermal distortions, which can include an orbit frequency component, may be caused by temperature changes as the sun angle changes during the day. ESA sensing errors, which may also include an orbit frequency component, can be due to changes in the Earth's appearance in the infrared portion of the electromagnetic radiation spectrum. Because the ESA provides the roll and pitch pointing reference for the spacecraft attitude control system, the payloads will experience a pointing error that is the combined effect of the thermal distortions and ESA sensing errors. Thermal distortions of a spacecraft structure and ESA sensing errors limit payload pointing achievable on spacecraft.

One way to decrease these errors is to modify the spacecraft structure to reduce thermal distortions. Unfortunately, this may increase the spacecraft weight and cost. Another possibility for reducing these errors is to locate the ESA where it does not thermally distort relative to the payload. This may be difficult because the ESA typically requires a clear field-of-view, and therefore must be mounted at the earth-facing end of the structure, away from the payloads.

The present invention can be used to improve payload pointing performance without requiring spacecraft structure modifications, or constraining the ESA location. The present invention provides a method that can utilize earth sensor assembly (ESA) and gyro body rate information to estimate and correct payload pointing errors due to thermal distortion and ESA sensing errors. The present invention can estimate the orbit frequency component of the angle between the inertial measurement unit (IMU) and the ESA. Assuming that the IMU can be mounted in a location such that its angle change relative to the payload is small, this estimated "distortion angle" will be approximately equal to the angle between the payload and the ESA reference frame. By including a dynamic model for the distortion angles in the formulation of the spacecraft on-board attitude determination Kalman Filter, the effects of the thermal distortions and ESA sensing errors may be eliminated from the inertial attitude estimates, and payload pointing is improved.

One advantage of the present invention is that is it can use previously unused information obtained on-board the spacecraft regarding the change in IMU pointing relative to the ESA over an orbit. This information is used to improve payload pointing performance. By using currently available information, the present invention does not require additional information or sources of information. By utilizing sensors and data currently available on spacecraft, the present invention can improve payload pointing performance without requiring modifications to the spacecraft structure that may add weight and increase cost.

FIG. 1 illustrates a block diagram of an embodiment of a payload pointing error correction system according to the present invention. This embodiment is particularly adapted for use with a high-power communications spacecraft. The spacecraft for carrying out this embodiment of a method according to the present invention can include attitude sensors. Examples of attitude sensors include earth sensors, sun sensors, and star trackers.

This embodiment of the system may operate as follows. Information from attitude sensors, in this case ESAs and sun sensors (SSAs), as well as the IMU angular rate outputs are input to an extended Kalman filter (EKF) used for attitude determination. Using inputs from spacecraft and sun ephemeris models, the EKF estimates the transformation from inertial to spacecraft body coordinates (attitude quaternion), the gyro biases, and the ESA to IMU distortion angles. By including a model for the variation of the distortion angles at orbit frequency, the thermal distortion and ESA sensing error effects may be removed from the estimated attitude quaternion and gyro biases, and pointing performance is improved.

According to a known implementation of an Extended Kalman Filter for attitude determination, the distortion angles are not estimated, which causes errors to be introduced into the attitude and gyro bias estimates. This is shown in the following discussion that for simplicity considers only pitch attitude determination. However, the concepts and formulation can be easily extended to three-axis attitude determination. The pitch attitude determination error dynamics, error dynamics along the spacecraft orbit normal, are given by Equation 1 below, $$\dot{x} = Ax, \; \theta_m = Hx \quad (1)$$

where $\theta_m$ is the ESA pitch measurement, and the state vector x and the matrices A and H are given by Equation 2 below, $$x = \begin{bmatrix} \theta \\ b \end{bmatrix}, \; A = \begin{bmatrix} 0 & -1 \\ 0 & 0 \end{bmatrix}, \; H = \begin{bmatrix} 1 & 0 \end{bmatrix} \quad (2)$$

where $\theta$ is the pitch attitude determination error, and b is the pitch gyro bias. From Equation 2 it can be seen that the pitch attitude determination error is simply the integral of the pitch gyro bias.

Therefore, for a Kalman filter formulated from this model, any inconsistency between the ESA pitch angle and the propagated IMU output will be attributed to the existence of a gyro bias, whether or not a gyro bias is actually present. In fact, the orbit frequency ($\omega_0$) component of the estimated gyro bias $\hat{b}(\omega_0)$ will in general include contributions from the following sources, only one of which is an actual gyro bias, $$\hat{b}(\omega_0) = b_{gyro}(\omega_0) + b_{orb}(\omega_0) + b_{therm}(\omega_0) + b_{esa}(\omega_0) \quad (3)$$

In the above expression $b_{gyro}(\omega_0)$ is the orbit frequency gyro bias component, $b_{orb}(\omega_0)$ is the orbit frequency pitch angle necessary to keep the spacecraft minus yaw axis aligned with the nadir vector, $b_{therm}(\omega_0)$ is the orbit frequency component of the IMU to ESA pitch thermal distortion, and $b_{esa}(\omega_0)$ is the orbit frequency component of the ESA pitch sensing error. Two of these terms, the actual gyro bias and the orbit pitch angle, are legitimate contributors to the estimated gyro bias. Their inclusion in the gyro bias estimate decreases the spacecraft pointing error. However, on some spacecraft, the actual gyro bias and the orbit pitch angle are normally the smallest contributors to the estimated gyro bias. The terms having the largest contribution to the estimated bias are the thermal distortion and ESA sensing error. The size of these apparent bias terms, their effect on spacecraft pointing, as well as the improvements made possible by the present invention are discussed below.

The smallest contribution to the estimated bias of Equation 3 is the actual gyro bias. Assuming an orbit frequency IMU temperature variation of about 3° C., which represents the actual temperature variation experienced by a known spacecraft, and specification level gyro bias performance (about 0.01°/hr 3-sigma for a temperature variation of about 10° C.), the orbit frequency gyro bias will be at most about 0.003 deg/hr, and most likely much lower. This bias, if uncompensated, would introduce a pitch error θ of about 0.011°, where θ is calculated from the following expression using an orbit rate of about 15°/hr, $$\theta = (180/\pi)(b/\omega_0) \quad (4)$$

The next largest term is the apparent gyro bias of about 0.0026°/hr, which results from the typical worst case observed in a known spacecraft of about 0.01° uncertainty in the pitch attitude variation at orbit frequency. This bias is caused by uncertainty in the spacecraft orbit eccentricity and the orientation of the eccentricity vector in the inertial frame.

In contrast to these errors, the IMU to ESA thermal distortion pitch angle may be as large as about 0.05°, which produces an apparent gyro bias of about 0.013°/hr. Another large contribution to the estimated bias is the approximately 0.03° ESA sensing error. This results in an apparent gyro bias of about 0.008°/hr.

For one known spacecraft, using a prior art EKF attitude determination approach and the values given above, the maximum pitch attitude determination error will be about 0.08°, which is the sum of the thermal distortion plus the ESA sensing error, that is, the worst-case error assuming they are in phase. Because the thermal distortion and ESA sensing errors are interpreted by the EKF as a gyro bias, instead of an attitude determination error, the spacecraft attitude determination knowledge and pointing is degraded commensurately. On the other hand, the error can be reduced to a maximum of about 0.021° if the EKF is formulated according to the invention to include distortion angle states that absorb the thermal distortion and ESA sensing error so that they do not corrupt the attitude and gyro bias estimates. This maximum error represents the sum of the gyro bias and orbit pitch variation. In the modified EKF, the variation in the measured pitch attitude determination error at orbit frequency is interpreted as a distortion angle instead of a gyro bias. In this case the residual error in the attitude determination knowledge and pointing will be due to the existence of an actual orbit frequency gyro bias and an actual pitch angle variation due to uncertainty in the orbit eccentricity which are incorporated into the distortion angle estimate.

The state vector x and the model matrices A and H for the pitch error dynamics including the distortion angle $\theta_d$ are, $$x = \begin{bmatrix} \theta \\ b \\ \theta_d \\ z \end{bmatrix}, \quad A = \begin{bmatrix} 0 & -1 & 0 & 0 \\ 0 & 0 & 0 & 0 \\ 0 & 0 & 0 & 1 \\ 0 & 0 & -\omega_0^2 & 0 \end{bmatrix}, \quad H = [\,1 \ \ 0 \ \ -1 \ \ 0\,] \quad (5)$$

The distortion angle dynamics implicit in Equation 5 are described by the second order differential equation, $$\ddot{\theta}_d + \omega_0^2 \omega_d = 0 \quad (6)$$

Equation 6 is satisfied for any distortion angle of the form, $$\theta_d(t) = c \, \sin(\omega_0 t + \phi) \quad (7)$$

where c is an arbitrary amplitude, and ø is an arbitrary phase angle.

Although the above discussion has focused only on pitch attitude determination, the present invention is general and can be applied to three-axis attitude determination. An EKF can be formulated that will provide estimates of the distortion angles on the yaw, roll, and pitch axes, and that provides improved accuracy attitude and gyro bias estimates that do not include these effects. Furthermore, the choice of attitude sensors does not need to be restricted to earth sensors. The approach can be used with star trackers, with the additional benefit that, because star trackers sense the spacecraft inertial attitude, the distortion angle will not include the effect of uncertainties in the spacecraft orbit position.

Additionally, it should be noted that the approach can be extended to periodic distortions of the form, $$\theta_d(t) = \sum_{i=1}^{N} c_i \sin(i\omega_0 t + \phi_i) \quad (8)$$

Such periodic distortion angles can be estimated by including additional states in Equation 5, to model the harmonics at $2\omega_0$, $3\omega_0$, etc.

Figure 2:
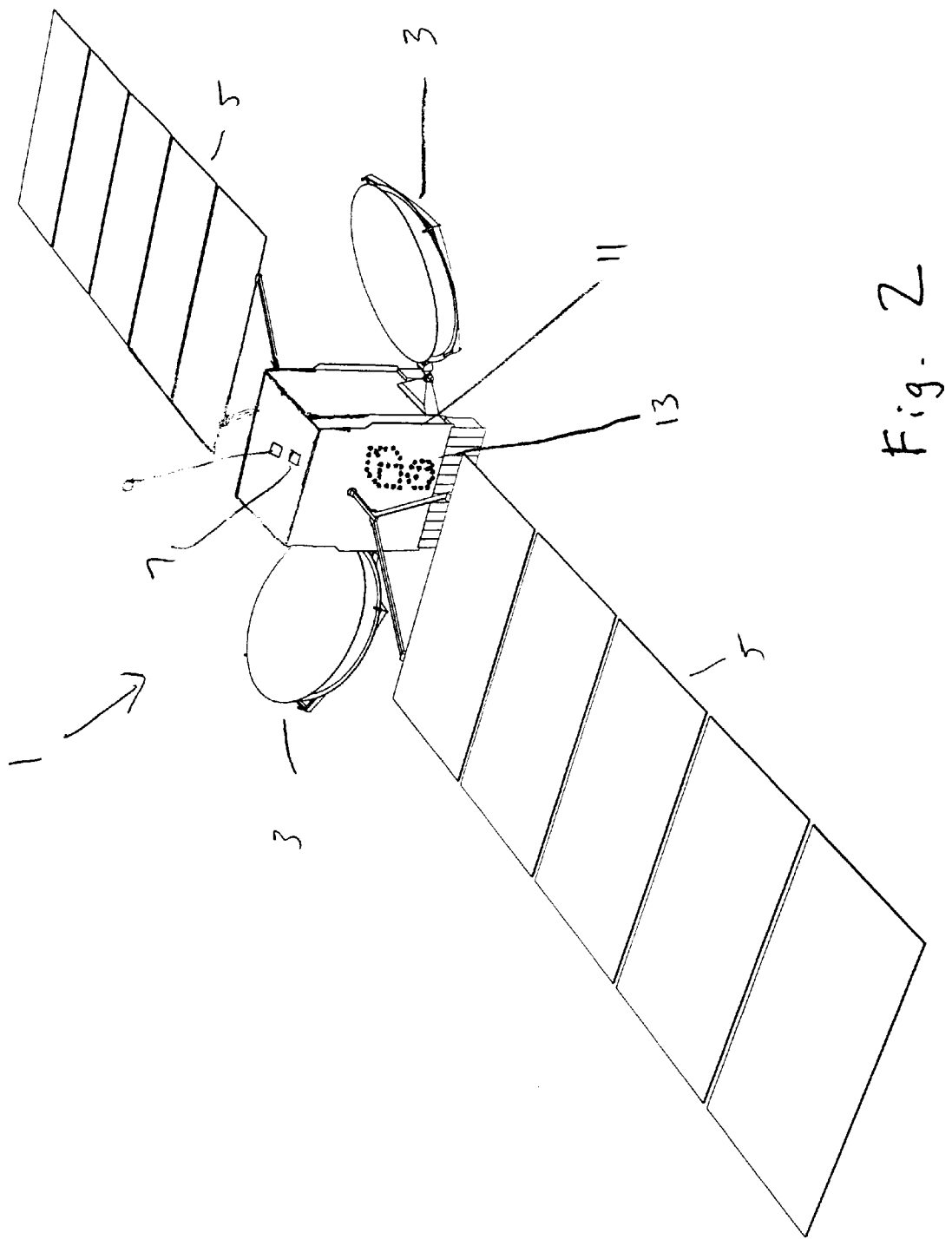
FIG. 2 represents a side view of an embodiment of a spacecraft according to the present invention.

FIG. 2 illustrates an embodiment of a spacecraft according to the present invention. The spacecraft I includes two payload antennas 3. A pair of solar panels 5 extend from the spacecraft. An earth sensor 7 and a sun sensor 9 are located on a side of the spacecraft that points toward the earth. An inertial measurement unit (IMU) 11 and an on-board computer 13 that includes a processor are also provided.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A method for correcting spacecraft pointing errors, the method comprising:
    estimating an orbit frequency distortion angle between a rate sensor and at least one attitude sensor; and
    adjusting an estimated attitude of the spacecraft to correct for the orbit frequency distortion angle.

2. The method according to claim 1, wherein the rate sensor is arranged in the vicinity of a spacecraft payload to minimize angular distortions between the rate sensor and the spacecraft payload.

3. The method according to claim 1, further comprising:
    estimating bias in the rate sensor measurements.

4. The method according to claim 1, wherein the at least one attitude sensor comprises at least one of an earth sensor, a star tracker, and a sun sensor.

5. The method as recited in claim 1, wherein the rate sensor comprises an inertial measurement unit.

6. The method as recited in claim 1, wherein the orbit frequency distortion angle is due to at least one of thermal distortion of the spacecraft and spacecraft attitude sensing errors.

7. The method according to claim 1, wherein the orbit frequency distortion angle is estimated by an extended Kalman filter.

8. The method according to claim 7, wherein the extended Kalman filter comprises a model for variations of distortion angles at orbit frequency.

9. The method according to claim 7, wherein the Kalman filter interprets variations in measured attitude determination at orbit frequency as distortion angles.

10. The method according to claim 1, wherein the pointing errors are periodic.

11. The method according to claim 1, wherein the pointing errors include harmonics of orbit frequency.

12. The method according to claim 1, further comprising:
    estimating an inertial to body frame quaternion.

13. A method for correcting payload pointing errors of a spacecraft, the method comprising:
    sensing the spacecraft attitude with an attitude sensor;
    determining an initial measurement unit angular rate; and
    estimating an orbit frequency of a distortion angle between an inertial measurement unit and the attitude sensor to determine a distortion angle between the payload and a reference frame of the attitude sensor.

14. The method according to claim 13, wherein the method employs an extended Kalman filter to estimate the orbit frequency component off the distortion angle between the inertial measurement unit and the attitude sensor.

15. The method according to claim 14, wherein the extended Kalman filter comprises distortion angle states that correct for thermal distortion and attitude sensor error.

16. The method according to claim 14, wherein the extended Kalman filter interprets variations in a measured attitude determination error at orbit frequency as a distortion angle.

17. The method as recited in claim 13, wherein the attitude sensor comprises at least one of an earth sensor, a star tracker, and a sun sensor.

18. An attitude control system for a spacecraft, comprising:
- a rate sensor;
- at least one attitude sensor; and
- a processor operable to estimate an orbit frequency distortion angle between the rate sensor and the at least one attitude sensor.

19. The attitude control system according to claim 18, wherein the processor is further operable to estimate an inertial to body frame quaternion of the spacecraft.

20. The attitude control system according to claim 18, wherein the rate sensor is arranged in the vicinity of a spacecraft payload to minimize angular distortions between the rate sensor and the spacecraft payload.

21. The attitude control system according to claim 18, wherein the processor is further operable to estimate bias in the rate sensor measurements.

22. The attitude control system according to claim 18, wherein the at least one attitude sensor comprises at least one of an earth sensor, a star tracker, and a sun sensor.

23. The attitude control system as recited in claim 18, wherein the rate sensor comprises an inertial measurement unit.

24. The attitude control system as recited in claim 18, wherein the orbit frequency distortion angle is due to at least one of thermal distortion of the spacecraft and spacecraft attitude sensing errors.

25. The attitude control system according to claim 18, wherein the orbit frequency distortion angle is estimated by an extended Kalman filter.

26. The attitude control system according to claim 25, wherein the extended Kalman filter comprises a model for variations of distortion angles at orbit frequency.

27. The attitude control system according to claim 25, wherein the Kalman filter interprets variations in measured attitude determination at orbit frequency as distortion angles.

28. The attitude control system according to claim 18, wherein the attitude control system is adapted to correct pointing errors that are periodic.

29. The attitude control system according to claim 28, wherein the pointing errors include harmonics of orbit frequency.

30. An attitude control system for a spacecraft, the attitude control system comprising:
- an inertial measurement unit;
- at least one attitude sensor operable to sense spacecraft attitude; and
- a processor operable to determine an inertial measurement unit angular rate and estimate an orbit frequency component of a distortion angle between the inertial measurement unit and the sensed attitude to determine a distortion angle between a spacecraft payload and a reference frame of the attitude sensor.

31. The attitude control system according to claim 30, further comprising an extended Kalman filter adapted to estimate the orbit frequency component off the distortion angle between the inertial measurement unit and the attitude sensor.

32. The attitude control system according to claim 31, wherein the extended Kalman filter comprises distortion angle states that correct for thermal distortion and attitude sensor error.

33. The attitude control system according to claim 31, wherein the extended Kalman filter interprets variations in a measured attitude determination error at orbit frequency as a distortion angle.

34. The attitude control system as recited in claim 30, wherein the attitude sensor comprises at least one of an earth sensor, a star tracker, and a sun sensor.

35. A spacecraft, comprising:
- a rate sensor;
- at least one attitude sensor; and
- a processor operable to estimate an orbit frequency distortion angle between the rate sensor and the at least on attitude sensor.

36. The spacecraft according to claim 35, wherein the rate sensor is arranged in the vicinity of a spacecraft payload to minimize angular distortions between the rate sensor and the spacecraft payload.

37. The spacecraft according to claim 35, wherein the processor is further operable to estimate bias in the rate sensor measurements.

38. The spacecraft according to claim 35, wherein the at least one attitude sensor comprises at least one of an earth sensor, a star tracker, and a sun sensor.

39. The spacecraft according to claim 35, wherein the rate sensor comprises an inertial measurement unit.

40. The spacecraft according to claim 35, wherein the orbit frequency distortion angle is due to at least one of thermal distortion of the spacecraft and spacecraft attitude sensing errors.

41. The spacecraft according to claim 35, wherein the orbit frequency distortion angle is estimated by an extended Kalman filter.

42. The spacecraft according to claim 41, wherein the extended Kalman filter comprises a model for variations of distortion angles at orbit frequency.

43. The spacecraft according to claim 41, wherein the Kalman filter interprets variations in measured attitude determination at orbit frequency as distortion angles.

44. The spacecraft according to claim 35, wherein the attitude control system is adapted to correct pointing errors that are periodic.

45. The spacecraft according to claim 44, wherein the pointing errors include harmonics of orbit frequency.

46. The spacecraft according to claim 35, wherein the processor is further operable to estimate an inertial to body frame quaternion of the spacecraft.

47. A spacecraft comprising:
- means for measuring inertial angular rates of the spacecraft;
- means for measuring an attitude of the spacecraft; and
- means for estimating an orbit frequency distortion angle between the means for measuring inertial angular rates and the means for measuring an attitude.

48. The spacecraft according to claim 47 wherein the means for measuring inertial angular rates comprises a rate sensor which is arranged in the vicinity of a spacecraft payload to minimize angular distortions between the rate sensor and the spacecraft payload.

49. The spacecraft according to claim 47 further comprising means for estimating bias in the measurements from the means for measuring inertial angular rates.

50. The spacecraft according to claim 47, wherein the means for measuring an attitude comprises at least one of an earth sensor, a star tracker, and a sun sensor.

51. The spacecraft according to claim 47, wherein the means for measuring inertial angular rates comprises an inertial measurement unit.

52. The spacecraft according to claim 47, wherein the orbit frequency distortion angle is due to at least one of thermal distortion of the spacecraft and spacecraft attitude sensing errors.

53. The spacecraft according to claim 47, wherein the means for estimating an orbit frequency distortion angle comprises an extended Kalman filter.

54. The spacecraft according to claim 53, wherein the extended Kalman filter comprises a model for variations of distortion angles at orbit frequency.

55. The spacecraft according to claim 53, wherein the Kalman filter interprets variations in measured attitude determination at orbit frequency as distortion angles.

56. The spacecraft according to claim 47, further comprising means for estimating an inertial to body frame quaternion of the spacecraft.

* * * * *